Nov. 6, 1934.  E. F. ROSSMAN  1,979,491
SHOCK ABSORBER.
Filed Aug. 22, 1932
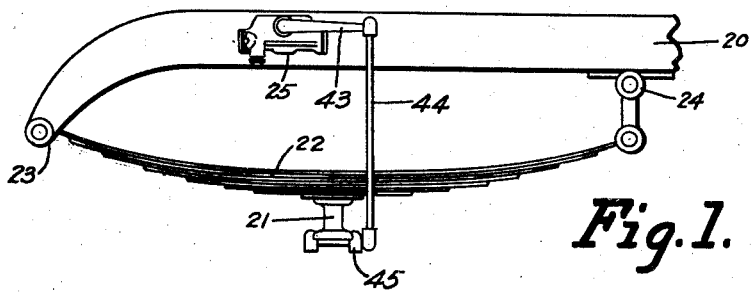
Fig. 1.
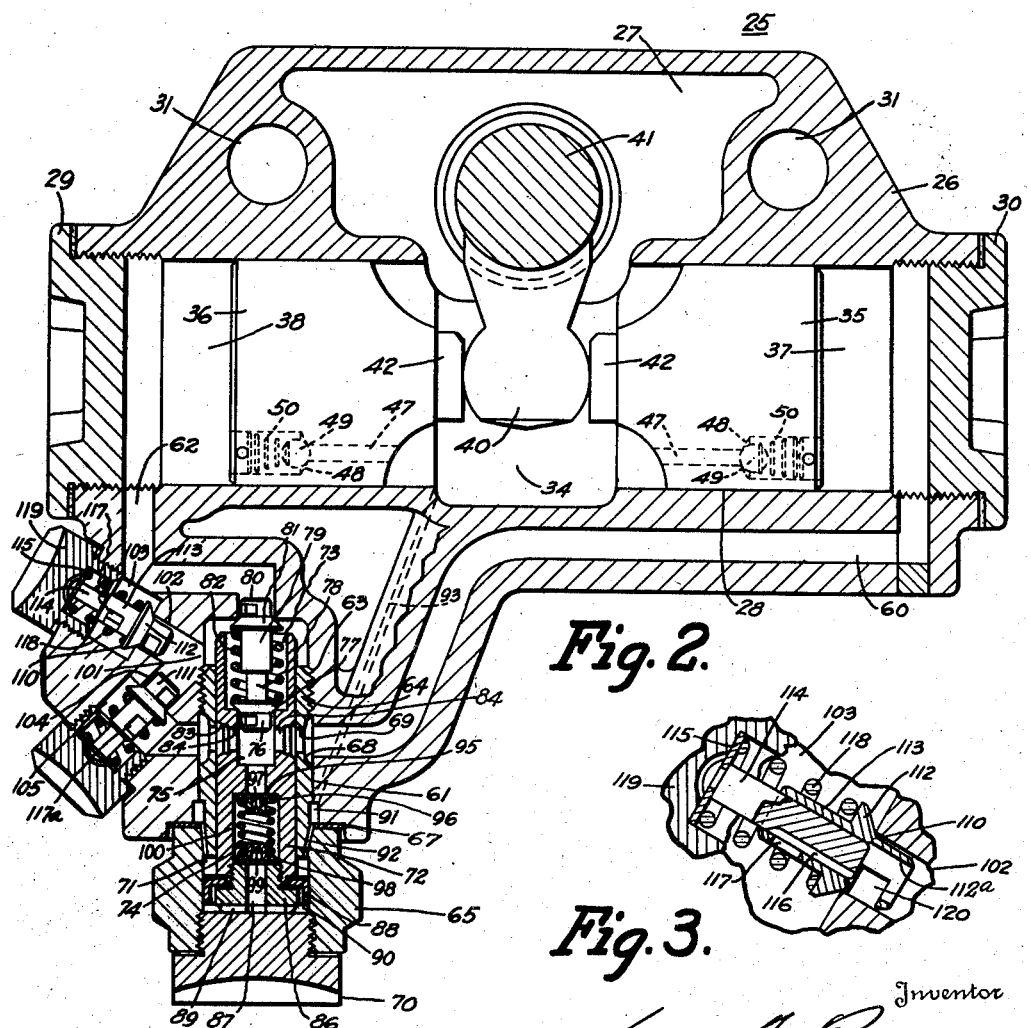
Fig. 2.
Fig. 3.
Inventor
Erwin F. Rossman
By Spencer, Hardman and Fehr
Attorneys Patented Nov. 6, 1934

1,979,491

UNITED STATES PATENT OFFICE 1,979,491

SHOCK ABSORBER

Edwin F. Rossman, Dayton, Ohio, assignor, by mesne assignments, to General Motors Corporation, Detroit, Mich., a corporation of Delaware Application August 22, 1932, Serial No. 629,772

9 Claims. (Cl. 188—88)

This invention relates to improvements in hydraulic shock absorbers, particularly of the double-acting type.

It is among the objects of the present invention to provide a double-acting shock absorber adapted to control the rebounding movement of the vehicle springs with a greater effort than the compression movement thereof.

A further object of the present invention is to utilize the fluid flow in one direction within the shock absorber resulting from the compression movement of the vehicle springs, for purposes of adjusting fluid flow control devices in the shock absorber, automatically to increase the restriction to the flow of fluid resulting from the rebounding movement of the vehicle springs.

Further objects and advantages of the present invention will be apparent from the following description, reference being had to the accompanying drawing wherein a preferred embodiment of one form of the present invention is clearly shown.

In the drawing:

Fig. 1 is a fragmentary side view of the vehicle chassis, with the road wheels omitted for the sake of clearness, a shock absorber, equipped with the present invention, being shown applied to the vehicle frame.

Fig. 2 is an enlarged longitudinal sectional view taken through the shock absorber.

Fig. 3 is a fragmentary sectional view illustrating one of the check valves of the shock absorber.

Referring to the drawing, the numeral 20 designates the frame of the vehicle which is supported upon the axle 21 by spring 22, said springs being hingedly attached to the frame at the points 23 and 24 respectively.

The shock absorber, designated as a whole by the numeral 25, comprises a casing 26 providing a fluid reservoir 27 and a cylinder 28, in communication with each other. The open ends of the cylinder 28 are closed respectively, by cylinder head caps 29 and 30 threadedly secured within the cylinder, provided with proper gaskets to prevent fluid leaks. The casing 26 has openings 31 for receiving bolts to attach the shock absorber to the frame 20 of the vehicle.

Within the cylinder 28 there is provided a piston 34 having head portions 35 and 36, the former forming the spring compression control chamber 37 adjacent the cylinder head cap 30, the latter the spring rebound control chamber 38 adjacent the cylinder head cap 29.

A space in the piston 28 between the head portions 35 and 36 thereof receives the rocker lever 40 which is secured to or forms part of a rocket shaft 41 journalled transversely of the casing 26.

The rocker lever or arm 40 directly engages wear-pieces 42 attached to the respective inside end surfaces of the piston head portions 35 and 36. One end of the rocker shaft 41 extends outside of the casing and has the shock absorber operating arm 43 provided thereon, the free end of which is swively secured to one end of a link 44, the oposite end of said link being swively secured to the member 45 anchored to the axle 21 in any suitable manner. The piston head portions 35 and 36 each have a passage 47 provided with a valve seat 48 against which a ball check valve 49 is yieldably urged by spring 50, these ball check valves acting as fluid replenishing valves for the respective chambers 37 and 38 for purposes of renewing the oil supply if any has leaked past the piston during any of the movements of the piston to exert pressure upon the fluid within chambers 37 and 38.

Compression of vehicle springs 22 during the movement of the axle 21 toward the frame 20 results in a counterclockwise movement of the arm 43 and a similar rotation of shaft 41 and lever 40. This movement of shaft 40 will move the piston 28 toward the right, as regards Fig. 2, for purposes of exerting pressure upon the fluid in the spring compression control chamber 37. Likewise the expanding movements of spring 22 in which the axle 21 moves away from the frame 20, will cause a reverse movement of the arm 40, resulting in a reciprocation of piston 28 toward the left to exert pressure upon the fluid within the spring rebound control chamber 38.

To circulate fluid from one compression chamber into the other ducts are provided in the casing of the shock absorber. One of these ducts is designated by the numeral 60 and leads from the spring compression control chamber 37 to a recess 61 in the casing of the shock absorber, more particularly duct or passage 60 opens into the side wall of recess 61 substantially midway between the outer and inner ends thereof. Duct 62 leads from the spring rebound control chamber 38 and opens into the inner or bottom wall of the recess 61 as shown in Fig. 2. Adjacent its inner end, recess 61 has interior threads 63 for receiving the threaded end of a sleeve 64, the outer end of which is provided with an enlarged head portion 65 in the form of a hollow nut, the inner end or edge of which is provided with a gasket 67 to prevent leaks at this point.

An annular groove 68, in the outer surface of the sleeve 64, is in direct alignment with the passage or duct 60 when said sleeve 64 is properly assembled into the recess 61. Side opening 69 provides communication between said annular groove 68 and the interior of the sleeve 61. The outer end of the sleeve 64, or more particularly the inner portion of the enlarged head 65 thereof, is interiorly threaded to receive the screw plug 70 which forms a chamber 71 within the head portion 65 of the sleeve 64. A piston 72, tubular in construction, is slidably carried within the sleeve 64, the piston having a recess 73 in its one end and another similar recess 74 in its other end, these recesses being in communication with each other through a central passage 75. The shoulder presented between the central passage 75 and the recess 73 provides a seat for the valve 76, said valve having a flange 77 provided with a sloping surface which engages said valve seat, this valve also having a stem 78 telescopically received by the tubular stem 79 of a valve 80. This valve 80 has a flange 81 similar to the flange 77 of valve 76, which is adapted to engage the valve seat provided by the shoulder formed where the duct 62 opens into the recess 61. A spring 82 is interposed between the flanges 81 and 77 of the valves 80 and 76 respectively, said spring urging the valves so that their respective flanges are yieldably maintained upon their respective seats.

The piston 72 has an annular groove 83 in communication with the central passage 75 of the piston, through side openings 84, the side openings 84 and the annular groove 83 being normally in direct alignment with the side openings 69 which open into the annular groove 68 in communication with the duct 60. The outer end of the piston 64 is interiorly threaded to receive the clamping screw 86, having a central passage 87 as shown. This clamping screw 86 securely clamps the fibrous sealing washer 88 to the main body of the piston 72. This fibrous washer 88, preferably of leather, acts as a substantially leak-proof sliding member of the piston engaging the interior annular wall of the cylindrical chamber 71. Transverse slots 89 are provided in the end surface of the clamping screw 86 adjacent the screw plug 70 so that when the piston 72 is in normal position and its clamping screw 86 rests upon the screw plug 70, a chamber 90, including the transverse slots 89 of said clamping screw 86 will be formed, this chamber being termed the "receiving chamber".

The portion of the chamber 71 above the piston washer 88, Fig. 2, is in communication with an annular chamber 91 through ducts 92 in the head portion 65, this annular chamber 91, in turn being in communication with the fluid reservoir 27 through a passage shown by the dotted lines 93. This communication between chamber portions 71 and the reservoir 27 is provided so that no fluid may be trapped above the piston washer 88 to retard its movement.

The shoulder 95 presented between the recess 74 in the piston and the central passage 75 therein, provides a seat for valve 96, said valve having an orifice 97 of predetermined size. A similar valve 98, provided with an orifice 99 larger than the orifice 97 of valve 96, is adapted normally to rest upon the inner end of the clamping screw 86. Both these valves are held normally against their respective seats by a spring 100.

As shown in Fig. 2, a Y-shaped passage 101 leads from the inner end of the recess 61, one branch 102 of this passage opening into a chamber 103 which is in communication with the duct 62. The other branch 104 of said passage 101 opens into a chamber 105 in communication with an extension of duct 60, said extension being in communication with the annular groove 68 of the sleeve 64 as is the opposite or main end of duct 60 which leads from the chamber 37. A valve 110 is provided in the chamber or recess 103 for controlling the fluid flow therethrough and a similar valve 111 is provided in the chamber 105 for controlling the fluid flow therethrough. Inasmuch as both of these valves are exactly alike, only one of them will be described detailedly, reference being had to the Fig. 3.

Valve 110 within the chamber 103 has a flange 112 and a tubular body portion 113. A stem 114, secured on one end to a washer 115, slidably supports the tubular valve portion 113. The stem 114 has the longitudinal groove 116 extending from the end thereof substantially halfway through the length of the stem, a side opening 117, in the tubular body portion 114 of the valve 110, being in communication with this groove 116. A spring 118, interposed between the flange 112 of the tubular valve portion and the washer 115 of the valve stem, which washer is received by and seats within a recess provided in the screw plug 119 of this valve, yieldably urges the movable portion of the valve so that its flange 112 is maintained yieldably in engagement with its seat formed by the shoulder presented between the passage branch 102 and the chamber 103. The tubular end 112a of the valve portion 110, which extends from the flange 112 into the passage 102, has a slot 120 in its side normally within the confines of the passage 102, thereby causing the fluid to urge valve 110 toward one side of the passage 102, when flow is established, and thus eliminating chattering of the valve, resulting in a better and more quiet fluid flow from the passage 102 into the chamber 103 when the fluid pressure in said passage 102 is sufficient to move the valve flange 112 from engagement with its valve seat against the effect of spring 118. At this time it must be remembered that valve 111 is also provided with a groove similar to the groove 116 in its stem portion and a side opening 117a in its tubular body portion for purposes of establishing initially restricted flows of fluid without movement of the valve being necessary.

The operation of the device will now be described. Assuming that the road wheels of the vehicle have met with an obstruction in the roadway so that the axle 21 has been thrust upwardly toward the frame 20 and the spring 22 has been compressed, this movement of the axle 21 will result in an upward thrust of link 44 and consequently a counter-clockwise rotation of the arm 43, shaft 41 and rocker arm or lever 40. As a result piston 28 is moved toward the right as regards Figs. 1 and 2, fluid within the chamber 37 will have pressure exerted thereupon, forcing said fluid through duct 60 into the space provided by the annular groove 68, thence through side opening 69 in the sleeve 64, through side opening 84 into the central passage 75 of piston 72. If the movement of the piston 28 has not been of sufficient force, the fluid will not have sufficient pressure to move valve 76 against the effect of spring 82 and consequently fluid will flow from the central passage 75 to the opposite side opening 84 of the piston 72 through side opening 69 of the sleeve 64 into annular groove 68 and through the extension of duct 60 into the chamber 105 containing valve 111, thence through the side opening 117a in said valve, through the groove in its stem, corresponding to groove 116 in the stem of valve 110, into the branch passage 104 thence through the branch passage 102 through the groove 116 and side opening 117 of the valve 110 in the chamber 103, thence from said chamber 103 through the duct 62 into the spring rebound control chamber 38.

If, on the contrary, the thrust of the piston 28 has been sufficiently forceful to exert a higher pressure upon the fluid within chamber 37, then the fluid flowing from duct 60 into the central passage 75 of the piston will move valve 76 from its seat, permitting fluid to flow into the recess 73 of the piston thence from the open end thereof into the recess 61 thence into the passage 101 and its branch 102, this fluid pressure moving valve 110 from its seat against the effect of spring 118 to establish another flow into the chamber 103 through duct 62 into the rebound chamber 38.

From the fluid circulating from duct 60 through the central passage 75 of the piston there will be shunted a flow of fluid, downwardly through the passage 75, against the valve 96 to move said valve from its seat, the fluid then flowing into the recess 74 of the piston and from this recess through the orifice 99 of the seated valve 98, central passage 87 of the clamping screw 86 into the fluid receiving chamber 90. Pressure built up within this chamber 90 will urge the piston 72 upwardly toward the inner end of the recess 61, this movement of the piston carrying with it the valve 77 and thereby compressing the spring 82 to increase its tension, consequently valve 80 has its flange 81 pressed upon its seat increasedly and thus requiring increased pressure to move it from its seat.

The springs 22, having reached the limit of their compression movement in response to the striking of this particular obstruction in the roadway, will rebound toward normal load position, thus causing a separating movement between the axle 21 and the frame 20 and thereby reversing the movement of the piston 28. Now piston 28 will move toward the left to exert pressure upon the fluid within the spring rebound control chamber 38, forcing fluid into the duct 62, the first flow of fluid will be established through the side openings and restricted grooves 117 and 116 respectively, of the two valves 110 and 111 respectively, as has been described heretofore so that this first flow will be established between ducts 62 and 60 through the chamber 102 and valve 110, passages 102, 101, 104 through the valve 111 into chamber 105 thence into the extension of duct 60. Higher fluid pressures, not capable of being properly relieved by the fluid flow through the restricted grooves 116 of the respective valves 110 and 111, will move valve 80 from its seat against the effect of the increasedly tensioned spring 82 so that fluid may flow from duct 62 past the valve 80 into the recess 61, thence into the passage 101 and passage 104, moving valve 111 from its seat to establish the flow into the chamber 105, thence into the extension of duct 60 through the various side openings and annular grooves of the sleeve 64 and piston 72 respectively, on its way to the spring compression control chamber 37 through the main portion of duct 60.

During this circulation of the fluid flow from chamber 38 to 37, the return movement of the piston 72 toward normal position is retarded by the restriction of the fluid flow from the fluid receiving chamber 90 by the small orificed valve 97, for, as pressure upon valve 80 and against spring 82 urges the piston 72 toward the screw plug 70, fluid flows from the receiving chamber 90 through the passage 87 past or through the valve 98, this fluid flow being restricted by the reduced orifice 97 in the valve 96 and thereby retarding the return movement of the piston 72. In order that fluid, trapped behind piston washer 88 may not retard the movement of piston 72 toward valve 76, there are provided passages 92 leading from the space behind said piston washer into an annular space 91 which in turn is connected to the reservoir by passage 93. This provides for a free action by piston 72 in an upwardly direction as regards Fig. 2.

From the aforegoing it may be seen that applicant has provided a shock absorber hydraulically operated, which is adapted to control both the approaching and separating movements of the vehicle frame and axle, the shock absorber having fluid flow restricting means automatically adjustable by a hydraulically operated piston in response to the approaching movements of the axle toward the vehicle frame, whereby the separating movements of said axle and frame are increasedly resisted.

Applicant uses fluid pressure set up within the shock absorber for automatically adjusting the said fluid flow control devices, the controls for the movement of said adjusting mechanism being contained within itself.

While the form of embodiment of the present invention as herein disclosed, constitutes a preferred form, it is to be understood that other forms might be adopted, all coming within the scope of the claims which follow.

What is claimed is as follows:

1. An hydraulic shock absorber comprising, in combination, means adapted to circulate fluid in two directions in said shock absorber; means adapted to control said fluid circulation in both directions, said means including a member movable by the pressure of the fluid flow in one direction for increasing the control of said means to the fluid flow in the other direction; and means carried by said member for regulating the fluid flow that moves said member.

2. An hydraulic shock absorber comprising, in combination, means adapted to circulate fluid in two directions in said shock absorber; two pressure release valves each one of which is adapted to control said fluid circulation in one direction; a common resilient member acting upon said valves to shut off fluid circulation; a piston adapted to be operated by the pressure of the fluid flow in one direction to increase the tension of the resilient member; and means carried by the piston for regulating the fluid flow which operates it.

3. In an hydraulic shock absorber adapted to resist the approaching and separating movements of two relatively movable members by the restriction of fluid circulation, the combination with spring loaded valves for restricting said fluid circulation; means adapted to be actuated by fluid pressure resulting from the circulation of fluid in response to one of the movements of said relatively movable members for increasing the spring load on said valves; and means carried by said aforementioned means for controlling the application and retraction of said power upon said aforementioned means during the said one and during the other movement of said relatively movable members, respectively.

4. An hydraulic shock absorber adapted to resist the approaching and separating movements of two relatively movable members by the restriction to fluid circulation in one or the other direction within the shock absorber respectively, comprising, means for circulating fluid; two oppositely acting pressure release valves for restricting fluid circulation; a single spring yieldably urging said valves into fluid flow restricting positions; a piston member providing a seat for one of the valves and having a passage adapted to establish a fluid flow to move said piston member to compress the valve spring in accordance with the fluid flow established in the shock absorber by the approaching movement of said relatively movable members; means in the piston passage for controlling the fluid flow that moves said piston; and means in the piston for retarding its return movement during the separating movement of said members.

5. An hydraulic shock absorber adapted to resist the approaching and separating movements of two relatively movable members by the restriction to fluid circulation in one or the other direction within the shock absorber respectively, comprising, means for circulating fluid; two oppositely acting pressure release valves for restricting fluid circulation; a single spring yieldably urging said valves into fluid flow restricting positions; a piston member providing a seat for one of the valves and forming a fluid receiving chamber, said piston having a passage adapted to shunt a portion of the fluid, circulating in response to the approaching movement of said relatively movable members, into said receiving chamber to move said piston for compressing the valve spring; a valve in said piston passage for regulating the flow of fluid into said receiving chamber; and another valve in the piston passage for restricting the flow of fluid from said receiving chamber to retard the return movement of the piston during the separating movement of said relatively movable members.

6. An hydraulic shock absorber adapted to resist the approaching and separating movements of two relatively movable members by the restriction to fluid circulation in one or the other direction within the shock absorber respectively, comprising, means for circulating fluid; two oppositely acting pressure release valves for restricting fluid circulation; a single spring yieldably urging said valves into fluid flow restricting positions; a piston member providing a seat for one of the valves and forming a fluid receiving chamber, said piston having a passage adapted to shunt a portion of the fluid, circulating in response to the approaching movement of said relatively movable members, into said receiving chamber to move said piston for compressing the valve spring; two orificed valves in said piston passage, spring urged into normal positions, the smaller orificed valve moving bodily in response to said shunted flow of fluid to establish the flow through the layer orificed valve into the receiving chamber for moving the piston to increase the tension of the pressure release valve spring, the larger orificed valve being movable bodily and the smaller orificed valve restricting the flow of fluid from said receiving chamber to retard the return movement of the piston during the separating movement of said relatively movable member.

7. An hydraulic shock absorber comprising, in combination, means adapted to circulate fluid in two directions within said shock absorber; separate valves for controlling the circulation of fluid in each direction; an actuator providing a fluid receiving chamber and means of communication between the said chamber and the circulating fluid, said actuator being adapted to adjust one of the valves to increase the regulating effect of both valves; and differential fluid regulating means in the actuator for controlling the fluid flow into and out of the receiving chamber.

8. An hydraulic shock absorber comprising, in combination, means adapted to circulate fluid in two directions within said shock absorber; separate valves for controlling fluid flow in each direction respectively; an actuator for adjusting the valves to increase their control of the fluid flow, said actuator providing a fluid receiving chamber and a passage connecting said chamber with the fluid flow; and means carried in the passage of the actuator for regulating the flow of fluid into and out of the fluid receiving chamber, the flow out of said chamber being restricted the greater degree.

9. An hydraulic shock absorber comprising, in combination, means adapted to circulate fluid in two directions within said shock absorber; two pressure release valves each one of which is adapted to control said fluid circulation in one direction; a single spring urging said valves into normal position; a piston providing the seat for one of said valves, said piston being adapted to be actuated by fluid pressure to adjust its engaging valve relatively to the other valve to increase spring pressure; a fluid receiving chamber behind said piston, in communication with the circulating fluid through a passage in said piston; and orificed valves in said piston passage providing for a freer flow of fluid into said receiving chamber than out of it.

EDWIN F. ROSSMAN.